Patented Mar. 15, 1938

2,111,504

UNITED STATES PATENT OFFICE 2,111,504

LIQUID ANTHELMINTICS

Max Bockmühl and Gustav Ehrhart, Frankfort-on-the-Main-Höchst, Germany, assignors to Winthrop Chemical Company, Inc., New York, N. Y., a corporation of New York No Drawing. Application November 3, 1936, Serial No. 109,061. In Germany November 8, 1935

4 Claims. (Cl. 167—55)

The present invention relates to liquid anthelmintics.

In the U. S. Patent No. 2,008,238 to Bockmühl et al. there are described liquid anthelmintics which contain liquid substances having an anthelmintic effect and an organic carboxylic acid salt of a basic derivative of a fatty acid containing at least 10 carbon atoms. Finely dispersed emulsions may be obtained from these liquids with water or aqueous liquids which may be administered in drinks or in capsules.

Now we have found that solutions of anthelmintics which are also suitable for the use in water may be prepared by using polyalkylene oxides or their derivatives as solvents for the liquid anthelmintics. There may, for instance be used polyethylene oxide, i. e., the ethylene oxide which is polymerized up to a wax-like consistency. Furthermore there may be used the hydroxyethylated castor oil obtained by self-condensation from castor oil and polyethylene oxide, hydroxyethylated ricinoleic acid, polyhydroxyethylated oleyl alcohol, polyhydroxyethylated palm nut fatty acid sorbite ester; the polyhydroxyethylated compounds named may, for instance, be obtained by the action of 10 to 20 molecular proportions of ethylene oxide upon one molecular proportion of the compound in question.

These solvents may also be applied in mixture with one another.

According to this invention solutions of any desired concentration may easily be prepared. The solutions may be administered in drinks or in capsules. They may be mixed with adjuvants, other desired medicines, substances which are capable of improving the taste, or the like. Liquid anthelmintics are, for instance, carbon tetrachloride, ethylene tetrachloride, ascaridol and chenopodium oil.

The following examples serve to illustrate the invention, but they are not intended to limit it thereto; the parts are by weight:

1. 100 parts of chenopodium oil are dissolved in 100 parts of polyethylene oxide.
2. 100 parts of carbon tetrachloride are dissolved in 100 parts of hydroxyethylated castor oil.
3. 50 parts of para-cymene are dissolved in 25 parts of polyethylene oxide and 25 parts of hydroxyethylated castor oil.
4. 50 parts of carbon tetrachloride are dissolved in 50 parts of polyhydroxyethylated oleyl alcohol.
5. 100 parts of trichloroethylene are dissolved in 80 parts of polyethylene oxide and 20 parts of polyhydroxylated palm nut fatty acid sorbite ester.

We claim:

1. Liquid anthelmintics comprising a compound selected from the group consisting of polyalkylene oxide and the derivatives thereof and a liquid substance soluble in said compound and known to have an anthelmintic effect, said anthelmintics yielding stable emulsions with water.
2. Liquid anthelmintics comprising polyethylene oxide and a liquid substance soluble in polyethylene oxide and known to have an anthelmintic effect, said anthelmintics yielding stable emulsions with water.
3. Liquid anthelmintics comprising hydroxyethylated castor oil and a liquid substance soluble in hydroxyethylated castor oil and known to have an anthelmintic effect, said anthelmintics yielding stable emulsions with water.
4. Liquid anthelmintics comprising polyhydroxyethylated oleyl alcohol and a liquid substance soluble in polyhydroxyethylated oleyl alcohol and known to have an anthelmintic effect, said anthelmintics yielding stable emulsions with water.

MAX BOCKMÜHL.
GUSTAV EHRHART.